May 9, 1944. C. H. JORGENSEN 2,348,544
AUTOMATIC CHOKE MECHANISM
Original Filed Dec. 30, 1935 3 Sheets-Sheet 2

INVENTOR
CLARENCE H. JORGENSEN
BY
ATTORNEY

May 9, 1944.                C. H. JORGENSEN                2,348,544
                       AUTOMATIC CHOKE MECHANISM
               Original Filed Dec. 30, 1935    3 Sheets-Sheet 3

INVENTOR
CLARENCE H. JORGENSEN
BY
ATTORNEY

Patented May 9, 1944

2,348,544

UNITED STATES PATENT OFFICE 2,348,544

AUTOMATIC CHOKE MECHANISM

Clarence H. Jorgensen, Anderson, Ind., assignor to General Motors Corporation, Detroit, Mich., a corporation of Delaware Continuation of application Serial No. 56,605, December 30, 1935. This application October 23, 1939, Serial No. 300,838

33 Claims. (Cl. 123—119)

This invention relates to automatic devices for controlling the ratio of fuel to air in the combustible mixture formed by a carburetor for an internal combustion engine, and more particularly to that type of mixture proportioning device which is controlled jointly by the operation of suction operated means and a thermally responsive device, the effect of which varies as the engine temperature varies.

This application is a continuation of application Serial No. 56,605, filed December 30, 1935.

A device of the general type described above is shown in the prior application of C. H. and P. J. Jorgensen, Serial No. 585,510, filed January 8, 1932, in which the mixture ratio is controlled during various operating conditions by the position of a valve in the air inlet of the carburetor which regulates the admission of air thereto, thus producing a mixture high in fuel content when the valve approaches closed position, and a mixture of less fuel content proportionally when the valve moves to a more nearly open position.

In the earlier joint application referred to, this air inlet valve is of the unbalanced type which the flow of air tends to open, is held in closed position by a spring and by the added effect of a thermostat when the engine temperature is relatively low, the thermostat acting to move the valve toward open position as the thermostat expands upon increase in engine temperature when the engine operates under its own power. In this way a rich mixture is provided for cold starting and a leaner mixture for normal running conditions.

Means are also provided in the earlier application for securing the admission of air in progressively increasing quantities, in the event of prolonged cranking of the engine without starting, so as to prevent flooding, and means is also disclosed in the earlier application which is operable to temporarily move the air inlet valve toward closed position upon opening of the throttle valve, so as to provide a richer mixture during the acceleration period, which, as is well known, is necessary to produce satisfactory engine operation under such conditions. The means for progressively leaning the mixture during engine cranking comprises a piston which can be termed a "master piston" indirectly connected to the air inlet valve through the medium of the thermostat, and slidable in a cylinder subject to the manifold vacuum which is communicated to such cylinder through a valve controlled conduit, while the closing of the air valve upon acceleration is brought about by the action of a suction controlled piston hereinafter termed a "kicker piston" which upon reduction of suction in the intake pipe, following an opening movement of the throttle, is moved by a spring to force the air inlet valve toward closed position against the pressure exerted by the air entering the carburetor.

Attention may be called to the fact that although a piston is shown in the earlier case, a means may be used as a substitute for the "master piston."

It is the general object of the present invention to provide certain specific improvements in the device disclosed in the earlier application so as to improve its action in certain particulars which will be apparent from the more specific description of the invention which appears later and to enable the device to more accurately control the proportioning of the mixture under the many different operating conditions which are met in actual service.

More specifically, one feature of the invention consists in the mounting of the choke controlling unit with the thermostat therein directly on the manifold hot spot to facilitate the heating of the thermostat and the provision of a suction conduit extending directly from the wall of the controlling unit through the wall of the hot spot into the intake passage, to prevent the necessity of the use of flexible tubing to form the suction conduit.

A further feature of the invention consists in the provision of a copper or other metallic gasket between the choke controlling unit and the manifold, which serves as a direct conductor of heat to a point adjacent the thermostat and is provided with a portion which extends partially or wholly around the thermostat to increase the heating effect on such element.

Another feature of this invention consists in the provision of a check valve in the top of the piston operable to produce a richer mixture during the acceleration period to prevent the movement by suction, of such piston in a direction to open the air inlet valve on increase of engine suction effective on the piston, under certain conditions.

An additional feature of the invention lies in the provision of means which may be manually adjustable for limiting the movement of the master piston or bellows due to suction so as to determine the position the thermostat assumes when the throttle is partly open so that the fuel air ratio of the part throttle mixture may be variably controlled.

A still further feature of the invention comprises a manually operable metering valve by means of which the suction conduit through which suction is communicated to the master piston from the engine may be controlled.

Another feature of the invention resides in the provision of means to prevent any fouling of the surface of this control valve by deposits which may precipitate from the combustible mixture.

Another feature of the invention consists in the provision of a tapered bleed slot in the wall of the cylinder in which the "kicker" piston slides in order to variably control the action of the piston in accordance with varying operating conditions and with varying positions of the choke valve when the opening movement of the throttle begins.

A further additional feature of the invention resides in the provision of an improved form of operating connections between the master piston or bellows and the air inlet valve, in which the master piston is connected directly to the free end of the thermostat, the other end of which is connected to a shaft on the end of which, outside the unit housing is an operating lever connected to the air valve.

A further feature of the invention consists in an improved form of idle control device which controls the closed or "idle" position of the throttle in accordance with the position of the choke valve, so that the idling speed of the engine is varied under different operating conditions, so as to prevent accidental stalling of the engine and to generally improve the idling operation under varying temperatures and other operating conditions.

An additional specific improvement which forms a feature of this invention comprises a nut secured in the housing of the control unit in which one end of the shaft to which the thermostat is secured, is journalled, which nut is provided with a hub on which the idle stop which controls the closed position of the throttle valve is rotatably mounted. The purpose of this arrangement is to prevent the pressure of the throttle closing spring treating friction with respect to the shaft to which the thermostat is secured, which would have to be overcome by the thermostat or the suction operated elements before such shaft could be moved to transmit motion to the air inlet valve.

A still further feature of the invention in its preferred form as disclosed in the drawings of this application, resides in the provision of a bellows which is operated by suction to control the position of the mixture proportioning element through the medium of the thermostat. While a master piston could be employed, there are certain specific advantages secured by the use of a bellows which will be obvious from the detailed description of the device illustrated, which appears hereinafter.

Further objects and advantages of the present invention will be apparent from the following description, reference being had to the accompanying drawings wherein a preferred embodiment of the present invention is clearly shown.

Figures 1, 7, 10:
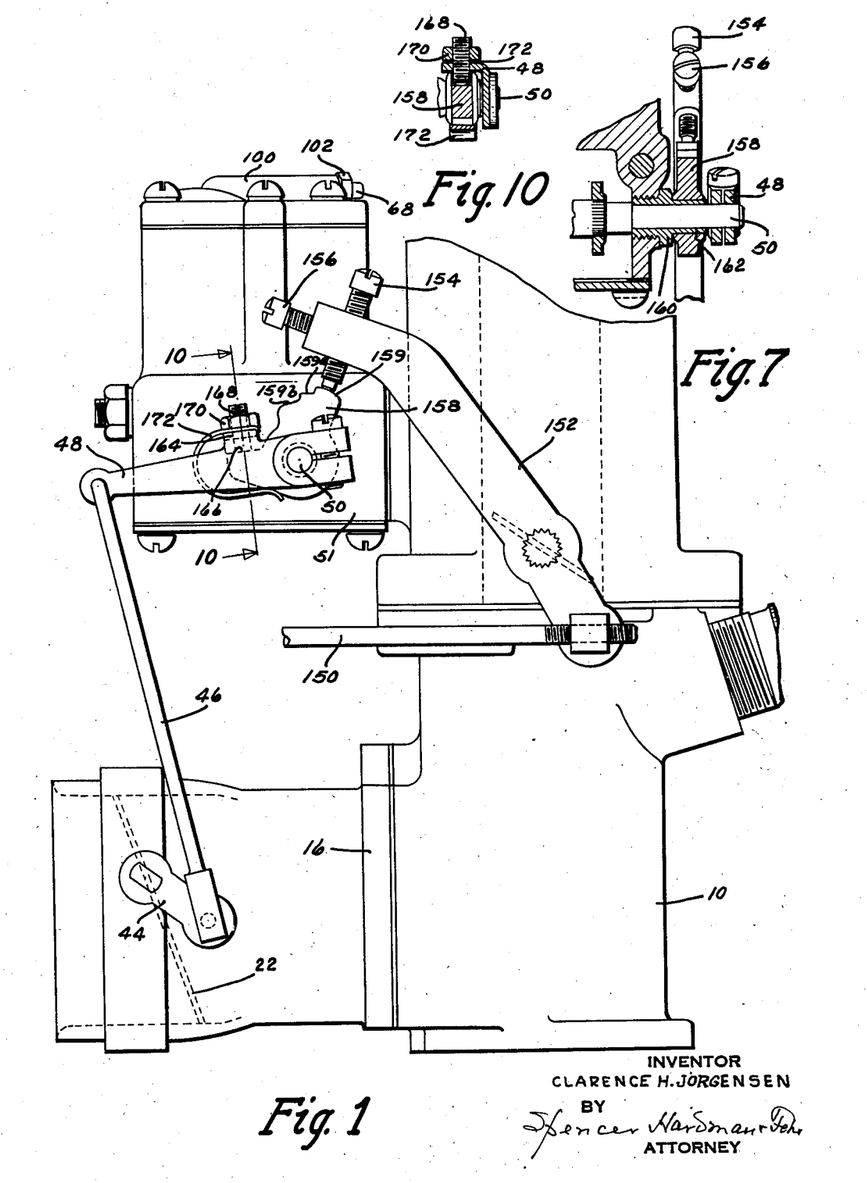
Fig. 1 is a side elevation of a charge forming unit and manifold with which the automatic choke mechanism which constitutes the present invention is incorporated.
Fig. 7 is a detailed view showing the manner of mounting the cam which constitutes the idle stop for variably regulating the idling speed of the engine against certain temperature conditions.
Fig. 10 is a vertical section on line 10—10 of Fig. 1.
Figure 9:
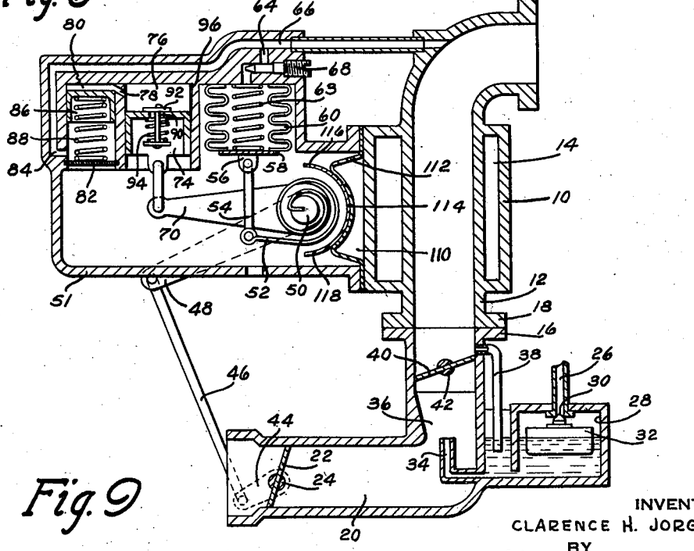
Fig. 9 is a diagrammatic view of the charge forming device with the control unit which constitutes the present invention incorporated therewith.

Referring most particularly to Figs. 1 and 9, the reference character 10 indicates in its entirety a carburetor of the conventional type which is secured to the riser 12 of an intake manifold having a heating chamber or hot spot 14 formed in its wall through which exhaust gas is adapted to be passed in the well known manner for the purpose of heating the ingoing charge of combustible mixture which is supplied to the engine. An attaching flange 16 is formed on the carburetor by which it is secured to a cooperating flange 18 on the manifold in the conventional manner.

The carburetor is provided with an air inlet 20 which is controlled by an air valve 22 of the unbalanced type, so that a blast of air entering the inlet tends to move said valve to open position, the valve being normally held closed by a spring on the shaft 24 to which said valve is secured, the spring not being shown in the drawings. This valve restricts the admission of air to the carburetor and in addition controls the pressure differential at the fuel nozzle to regulate the ratio of fuel to air in the mixture which is supplied by the carburetor to the engine.

Fuel is supplied through a fuel inlet pipe 26 to a float chamber 28 of conventional form and in which a constant level is maintained by a valve 30 carried by float 32 and operating in the usual conventional manner. Fuel flows from the float chamber into the mixture passage through a fuel nozzle 34 which terminates substantially at the point of greatest suction in a Venturi tube 36 provided for the purpose of creating a high suction at the nozzle outlet as is customary in conventional carburetors. The flow of fuel from the nozzle may be controlled in any conventional manner as by a fuel valve or metering plug having a fixed orifice and a secondary fuel supply tube 38 may be provided to supply fuel at a point between the throttle valve and the engine for idling as is the custom in conventional carburetors generally.

The flow of mixture from the carburetor to the engine is controlled by a throttle valve 40 secured to a shaft 42 journalled in the carburetor housing in the usual way.

All of the foregoing construction is old, is shown in the prior joint application previously referred to and constitutes no part of the present invention, except insofar as the choke valve 22 is operated and controlled by the automatic control unit which will presently be described and in the detailed construction of which the present invention resides.

The choke control unit is adapted to control the position of the valve 22 and in this manner to control the fuel air ratio of the mixture supplied to the engine. For this purpose the shaft 24 has secured to one end which projects beyond the carburetor housing an arm 44 which is connected pivotally to a link 46 connected pivotally to an arm 48 which is secured in any desirable manner to a shaft 50 which is journalled in the housing 51 of the control unit in a manner hereinafter described and the movement of which shaft is controlled by a thermally responsive element and suction operated means, so that the position of said shaft is determined by the temperature conditions, and the degree of suction which is communicated from the intake passage to the suction operated elements referred to, to regulate the position of the valve 22. Obviously the construction is such that rotation of the shaft 50 is transmitted to the shaft 24, the relative degree of rotation of these shafts, of course, depending on the length of the lever arms to which link 46 is secured.

Figures 2, 3, 8:
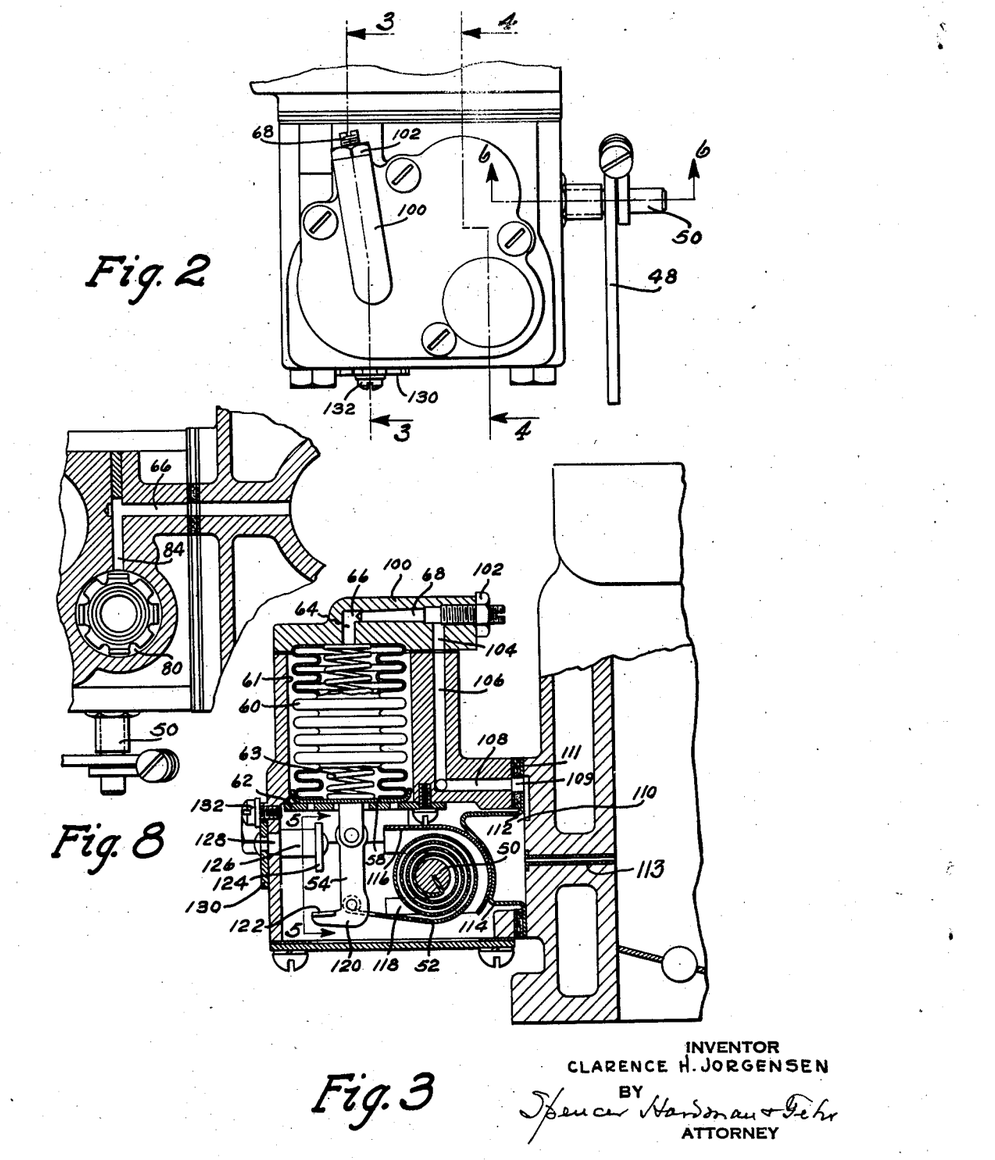
Fig. 2 is a plan view of the choke controlling unit.
Figs. 3 and 4 are vertical sectional views through the control unit on the lines 3—3 and 4—4 of Fig. 2.
Fig. 8 is a detailed horizontal section showing the suction passage which communicates with one of the suction operated elements controlling the choke valve.

To control the motion of the shaft 50 there is connected at one end to such shaft a bimetallic thermostat 52 of the coil type, the free end of which is pivotally connected to a link 54 which at its upper end is connected to an ear 56 projecting from a plate 58 which comprises the lower end of a metallic or other bellows 60 received in a cylinder 61 formed in the housing 52 and closed at its lower end by a closure plate 62. The bellows is normally held in its expanded position by a spring 63 which is positioned within the bellows, as clearly shown in the Fig. 9. The interior of the bellows 60 communicates with a suction passage 64 formed in the cover plate or the control unit and through which the suction of the intake manifold is communicated to the bellows, and which communicates with the horizontal suction passage 66 in which a tapered metering valve 68 is positioned as shown in Fig. 3, which is manually adjustable to variably control the effective area of the suction passage which communicates with the bellows for a purpose more fully described hereinafter.

Normally, when the engine temperature is low, and the various parts of the control device are relatively cold, such parts occupy the position shown in the diagrammatic view of Fig. 9 with the valve 22 in closed position. Both the thermostat, when the temperature is low, and the spring 63 within the bellows tend to hold the valve 22 closed and the force of these elements as well as the spring which is on the shaft 24 all tend to hold the valve closed when the temperature is low. The spring 63 holds the bellows in expanded position and determines the position of one end of the thermostatic coil. As the engine warms up the thermostat would, of course, expand, and this increase in temperature and resulting expansion of the thermostat will cause a clockwise movement of the arm 48 so that the thermostat will assume a position at a higher temperature which would be effective to move the valve toward a partially open position. When the engine has fully warmed up the effect of the thermostat would be to move the valve toward fully open position as the thermostatic coil continues to expand.

The action of the engine suction upon the bellows is utilized to move the air valve 22 toward its open position in the event that the engine does not start to run within a relatively short time after the cranking of the engine begins and also to move the value still further toward open position when the engine is started cold and begins to run under its own power.

The engine suction is communicated through the suction passages previously described to the interior of the bellows as has already been set forth and the air within the bellows is slowly drawn out by action of this suction tending to contract the bellows and through the medium of the link 54 to pull upwardly on the free end of the thermostat and through the medium of the thermostat itself, to rotate the shaft 50 in a direction to move the arm 48 in a clockwise direction to effect opening of the valve 22. The metering valve 68 is designed to be positioned so that the effective area of the suction passage is very small which results in a slow exhaustion of air from the bellows 62, the valve being manually adjustable so that it may be set to secure exactly the result desired. With this construction the bellows does not contract sufficiently to move the valve 22 toward open position until sufficient time has elapsed for the engine to start normally, but it does contract sufficiently to open the valve 22 if the cranking operation is prolonged. The contraction of the bellows will then pull the link upwardly enough to rotate the shaft 60 through the medium of the thermostat to move the valve 22 toward open position and admit air to the carburetor.

As indicated previously, this mechanism is provided in part for the purpose of preventing flooding in the event that the engine does not start in a very brief period after the cranking begins. If the valve 22 remains closed and no means were provided to open the valve to at least a partial extent as above described, the restriction of the air inlet would be so great that sufficient fuel would accumulate in the engine to cause flooding and make starting very difficult. By partially opening the valve 22 in the event of failure to start within a comparatively brief time, this difficulty is prevented, as sufficient air is admitted to the engine cylinders to carry out the excess fuel which would cause the flooding referred to.

Of course, when the engine begins to run under its own power, there is a very considerable increase in suction in the intake passage at points between the throttle and the engine due to the sudden increase in the speed of movemnt of the engine pistons which takes place when the engine begins to run. At this time it is necessary that additional air be admitted to form a properly proportioned fuel mixture and the bellows is designed to enable this admission of air to be brought about. The increase of suction referred to is effective to further contract the bellows 62 and to move the valve 22 to a still further open position through the medium of the thermostat.

Necessarily, the time required for contraction of the bellows to accomplish the results just referred to varies somewhat under different conditions, not being the same in cold and hot weather, for instance. Also with varying fuels and because of the fact that engines vary in the degree of suction produced in the intake passage due to wear and improperly seating valves and for other reasons, it is desirable to provide means for variably regulating the degree of suction communicated to the bellows to meet all of these variable conditions and for this purpose the manually operable metering valve 68 has been provided.

By provision of the adjustable valve to time the opening of the choke valve by action of suction, stalling of the engine is prevented. Such stalling might otherwise occur when the engine first begins to operate under its own power, as a result of admission of too much air which might take place if the suction passage to the bellows were not controlled. When the valve in the suction passage is suitably adjusted, the time required to build up sufficient suction in the bellows can be controlled so that the air valve will not be opened too quickly.

In the device disclosed in the prior application, a metering valve was disclosed which controls the suction passage communicating with the cylinder in which a piston slides which operates the air valve in much the same way as does the bellows disclosed in this application, but such valve in the earlier case was controlled entirely by temperature. This valve was only partially successful in eliminating the difficulties presented under variable operating conditions, whereas the manually adjustable valve provided according to this invention can be so set at any time as to take care of such difficulties as may arise.

As indicated previously, means are provided to operate the valve 22 in such manner as to enrich the mixture during the acceleration period. In order to accomplish this purpose, the shaft 50 has secured thereto inside the housing 51 of the control unit, an arm 70, one end of which is pivotally connected to a piston 74 slidable in a cylinder 76 formed in the control unit housing. The upper part of the cylinder 76 is connected by a passage 78 with a cylinder 80 which is also formed in the housing of the control unit adjacent the cylinder 76. The cylinder 80 communicates at its lower end which is closed by a metallic plate 82 with a suction passage 84 which communicates with the passage 66 previously mentioned and through this passage with the manifold. A piston 86 is slidable within the cylinder 80 and is normally held in its upper position as shown in the drawings by a spring 88 which is received between the piston and a washer 89 which rests on the metallic closure plate 82 in the lower end of the cylinder.

The piston 74 is provided with a port 90 which is normally closed by a valve 92 held in closed position by a spring 94 the purpose of which will be apparent from the following description of the operation of this mechanism. Obviously, downward motion of the piston 74 will move the arm 70 in a counterclockwise direction. This arm being secured to the shaft 50 will rotate the shaft and through the medium of the connection between such shaft and the valve 22 moves the latter toward closed position. When the suction is relatively high in the manifold this high suction communicates to the cylinder 80 below the piston 86 therein and pulls the piston downwardly toward the bottom of the cylinder. The piston 74 is occupying some position in the cylinder 76 which is determined by the lifting effect of the bellows and the action of the thermostat on the shaft 50. If it be assumed that from some given position of the throttle the latter is suddenly opened to increase the engine speed, the vacuum in the manifold will immediately drop and this reduction in suction below the piston 86 will permit the spring 88 to move such piston upwardly and through the medium of passage 78, will create a positive pressure in the cylinder 76 above the piston 74 to force the latter downwardly and move the valve 22 toward closed position as described. As the engine picks up speed the suction in the manifold will increase to some extent which will result in some motion of the piston 86 downwardly, relieving the pressure above the piston 74 and the effect of the thermostat and bellows brings about a motion of the arm 70 upwardly to partly open the valve following the temporary closing movement just described.

The purpose of the valve 92 is to prevent the increase in suction, which takes place in the cylinder 76 as the suction in the manifold increases, from exerting a force on the piston 74 tending to lift such piston and through the piston to open the air valve. In other words, it is desired that the entire effect of the suction to open the valve 22 will be brought about by the bellows and not by the piston 74. If it were not for this check valve, any increase in suction in the space above the piston 74 due to downward movement of piston 86 would tend to lift the piston 74, and through such piston, to open the air valve. It is clear that such action cannot be permitted to take place as the suction passage leading to the cylinder 80 is not controlled by the valve 68 and would move the shaft 50 to open valve 22 too quickly if effective. The spring held check valve, however, will open and permit air to flow through the port 90 preventing such action from taking place.

Formed in the wall of the cylinder 76 is a tapered slot indicated by the reference character 96 which is provided for the purpose of securing the degree of closing movement of the valve 22 during the acceleration period in accordance with the particular conditions of operation which may prevail at the time the throttle is opened to bring about such acceleration. It has been found that the degree of enrichment of the mixture which is necessary during the acceleration period varies considerably depending upon the conditions of operation when the acceleration is effected. For instance, if the temperature of the engine is high and if the engine speed is quite high when the acceleration takes place, less mixture enrichment is necessary than when the engine is cold, or is running slower.

In order to effect this difference in the amount of enrichment for different conditions, the tapered slot is provided to permit a flow of air past the piston 74 under certain conditions and to vary this flow of air in accordance with the position of the piston in the cylinder when the pressure is created above such piston by the upward movement of the piston 86. For instance, if the piston 74 is occupying a position near the bottom of the cylinder 76 when the throttle is opened and the increase in pressure in the cylinder 76 above piston 74 takes place, the movement of the piston should and will be relatively greater for the same increase in pressure above such piston than if the piston 74 is occupying a higher position in the cylinder 76 when the throttle valve is opened with a resulting increase in pressure above such piston 74. Obviously, when the piston 74 is near the top of the cylinder 76 there is a greater leakage of air permitted past the piston through the tapered slot 96 than if the piston 74 is nearer the bottom of the cylinder and when the piston is relatively close to the bottom of the cylinder, the tapered slot is substantially entirely closed by the skirt of the piston.

It will also be noted particularly that the point of communication of the passage 80 with the cylinder 76 is such that when the thermostat is fully expanded and the valve 22 is wide open, the piston 74 is above this point of communication. This construction is provided because it is not desired to bring about any closing movement of the valve 22 following opening movement of the throttle when the throttle is nearly wide open, or when the temperature and suction conditions are such that the valve 22 has been moved to its wide open position by the action of the thermostat and the suction operated means. The closing movement of the valve 22 is not necessary under the conditions referred to.

Means are provided according to the present invention to subject the thermally responsive element directly to the heat effect of the heating chamber or hot spot. For this purpose the control unit housing 51 is adapted to be secured as indicated in the drawings directly against the wall of the heating chamber 14. The unit may be attached by machine screws or any other suitable means. It will also be noted, particular attention being invited to Figs. 3 and 8, that the suction passages which lead to the bellows and to the cylinder 86 are joined in the wall of the housing 52 and form a single passage which communicates with a corresponding passage in the wall of the heating chamber which extends to the intake passage as shown in Fig. 3. The previously described suction passage 66 is formed in a removable cover plate 100 which is adapted to be secured to the main housing 52 by screws or other suitable means and as pointed out previously, the manually operable needle valve is positioned in this horizontal passage 66 as clearly shown in Fig. 3. This valve may be adjusted to any desired position and located in position by a lock nut 102. Communicating with the passage 66 adjacent the valve is a short vertical passage 104 also formed in the cover plate 100 which connects with a passage 106 in the vertical wall of the housing 51 and in turn connects with a horizontal passage 108 also in the wall of the housing 51. Passage 108 communicates with a passage 109 in the wall of the heating chamber which extends to a space 110 between the wall of the heating chamber and a metal gasket 111, hereinafter described. Extending through the wall of the heating chamber and connecting the space 110 with the intake passage is a restricted tube 113. Also communicating with the vertical passage 106 is the passage 84 previously mentioned, which communicates with the lower portion of the cylinder 80. By constructing the suction passages in this manner, all of these passages are formed by drilling in the walls of the unit and the use of flexible tubes is avoided which assists in the prevention of leaks and breakage of the tubes, and forms a much superior construction.

The space 110 forms a sump in the suction line to the bellows which is provided for the following reasons. Upon reduction of suction following an opening movement of the throttle, there is a surge of mixture through the suction passage toward the bellows. This fuel mixture, particularly if ethyl gasolines are used as fuel, is likely to form a film of precipitation on the valve and other portions of the suction passage. The space 110 forms a chamber or sump in which the liquid fuel content of the mixture is vaporized so that such a film is not formed on the valve and the passage wall with which the valve cooperates.

As indicated above, by mounting the thermostat directly on the wall of the heating chamber the thermostat is positioned in close proximity to the heating chamber which is maintained at the desired temperature to control the expansion of the thermostat. It has been found that by controlling the thermostat in this way its operation is such as to provide a mixture of more nearly the proper fuel air ratio than can be secured if the thermostat is remote from the heating chamber and means are provided to conduct exhaust gas from the exhaust manifold to heat the thermostat or to provide a heating means of other form.

Secured between the control unit and the wall of the heating chamber is a copper or other metal gasket 112 which is projected outwardly toward the thermostat at 114 and is provided with an extending portion 116 which extends partly around the thermostat and also end portions 118 which project adjacent the ends of the thermostatic coil. This gasket serves as a positive metallic conductor of heat from the heating chamber to a point immediately adjacent and around the thermostatic coil and also acts as a shield to prevent the thermostat being cooled by such air as may be admitted to the chamber in the housing 52 in which the thermostatic coil is positioned. By the provision of this gasket and heat conducting shield, it has been found that the operation of the thermostat is much improved and less variable than if such means is not provided.

It may be here noted that the control unit is provided with a removable bottom plate 117 in which orifices 119 for the admission of air are formed. These orifices are covered by a porous washer 121, secured between a shield 123 also having orifices 125 corresponding to orifices 119 in the bottom plate, this assembly being secured together by a rivet 127.

Adjustable means are provided to limit the upward movement of the bellows under the influence of suction for the purpose of variably controlling the richness of the mixture under part throttle operating conditions when the valve 22 is not fully opened by the thermostat, that is when the engine temperature is not high enough to cause the thermostat to open the valve 22 to a wide open position and the position of the valve is determined by the effect of suction on the bellows which may be great enough under part throttle operating conditions to move the valve 22 to such a wide open position as to form too lean a mixture for satisfactory operation.

Figures 4, 5, 6:
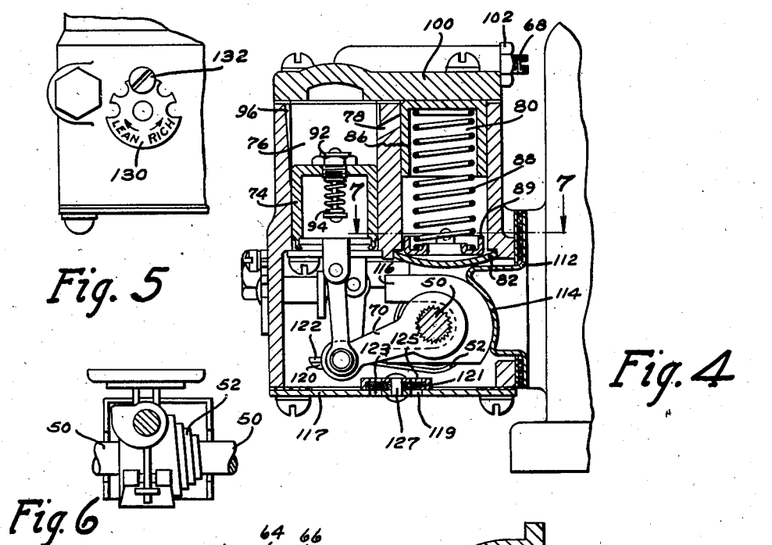
Fig. 5 is a detailed elevation of a manually adjustable device for controlling the mixture ratio under part throttle operating conditions.
Fig. 6 is a detail view of the mechanism which is controlled by the manually adjustable element shown in Fig. 5.

For accomplishing this result, the link 54 at its lower end has a horizontal portion 120 which supports integrally therewith, or in any other suitable manner, a flat surface 122 which is adapted to engage a stop cam 124 as the bellows contracts and the link 54 is lifted. The cam 124 lies in the path of movement of the surface 122 and is secured in any suitable manner to the inner end of a stud 126 which is provided with a reduced portion 128 received in an orifice in the wall of the housing 51 to permit rotation of the stud carrying the cam. Outside the housing 52 there is secured to the stud an indicating plate 130, by means of which the stud can be rotated and is held in any set position by screw 132 as shown in Fig. 5. The cam is so shaped when the plate 130 is set in different positions, it will variably limit the upward movement of link 54 by engagement of the surface 122 with the cam. The word limit is used here and in the claims in the sense of positively stopping the particular movement of link 54 referred to.

The relative arrangement of the thermally responsive means and suction operated means with respect to the operating link which extends to the air inlet valve have been modified in construction and improved in function. In the earlier application the suction operated element corresponding to the bellows 60 is connected to a rigid arm secured to the shaft to which one end of the thermostat is connected, while the free end of the thermostat is connected to the link which extends to the valve operating arm corresponding to the arm 44. This construction necessitated bringing the link corresponding to the link 46 into the space within the housing of the control unit, since the thermostat must, obviously, be positioned within the unit. Such a construction presented certain difficulties, manufacturing and otherwise, which are overcome by the present construction, in which the free end of the thermostat is connected directly to the suction operated element, and the shaft to which the other end of the thermostat is connected has an operating arm thereto outside the housing which is connected directly to the valve operating arm 44. This modified arrangement is a minor improvement structurally, but its practical advantages are relatively important.

It has been found that when an automatic choke mechanism is employed, it is desirable to provide what is termed a "fast idle" device, that is, a means for causing the engine to rotate faster when idling cold than what is considered a normal or hot idling speed. Such a device is desirable to prevent stalling of the engine after it commences to run under its own power when cold. It is equally obvious that under normal conditions, as when the engine temperature is relatively high, so high an idling speed is understandable. Therefore, in accordance with the present invention, means have been provided to variably control the idling speed for different conditions of operation, such speed being controlled by the position of the choke.

The idling speed of the engine is regulated by providing a stop to limit the movement of the throttle toward closed position. Referring to Fig. 1, the numeral 150 indicates the throttle operating link, which is adjustably connected in any suitable way to a throttle operating arm 152 secured to the throttle shaft. This arm carries a stop screw 154 held in position by a lock screw 156 and adapted to engage a graduated stop cam 158 which is formed with three stop surfaces 159, 159a and 159b, this cam being positioned by the choke controlling mechanism.

It will be noted upon examination of Fig. 7 that the shaft 50 to which the thermostat is secured is journalled at one end in a nut 160 screwed into the housing 51. This nut is provided with a projecting hub portion 162 on which the stop cam 158 is journalled. The operating lever 48 to which the operating link for the choke valve 22 is connected has a laterally projecting ear 164 which overlies a projecting toe 166 formed on the stop cam. A set screw 168 adapted to engage the toe 166 is screwed into this ear and is provided with a lock nut 170 between which and the ear is clamped one end of a U-shaped flat spring, the other end of which extends around and below the toe on the idle stop.

Obviously, with the arrangement disclosed, the idle stop is moved positively toward the position shown in Fig. 1, as the valve 22 is moved toward closed position by engagement of the screw 168 with the toe of the stop cam. In this position the surface 159 engages stop screw 154 to hold the throttle open to an appreciable extent for fast idling. The purpose of spring 172 is to permit the choke control lever 48 to move toward the open position as the engine warms up on idle or during our timed vacuum take off which would otherwise be prevented by the pressure of the idle screw 154 on cam 158 due to force of throttle return spring. Otherwise the engine would get too rich if the throttle was not opened during warmup.

As the valve 22 moves toward open position upon an increase in temperature, the stop cam is yieldingly moved by action of the spring 172 so as to successively bring the stop surfaces 159a and 159b into position to engage the screw 154 so as to permit the throttle to move to a more nearly closed position for idling as the choke valve is moved to a more nearly open position.

Particular attention is directed to the fact that the stop cam is journalled on the hub of the nut 160 instead of being journalled on the shaft 50. The purpose of this construction is to prevent the pressure of the throttle closing spring which is exerted against the stop cam, from causing frictional resistance to the motion of the shaft 50, which must be free to move under the influence of the control unit in order that the mixture ratio be maintained accurately in the proportions desired.

While the embodiment of the present invention as herein disclosed, constitutes a preferred form, it is to be understood that other forms might be adopted, all coming within the scope of the claims which follow.

What is claimed is as follows:

1. An automatic choke mechanism for the charge forming device of an internal combustion engine having an intake manifold provided with a heating chamber for heating the combustible mixture supplied to the engine, and comprising, in combination, a mixture proportioning means, a control unit for operating said mixture proportioning means and including a housing, thermally responsive means in said housing adapted to operate the mixture proportioning means, suction operated element adapted to move the mixture proportioning means, and adjustable means to limit the movement of said suction operated means in one direction of movement, said means comprising an angular member connected to the suction operated element and an adjustable stop member engaging said angular member.

2. An automatic choke mechanism for the charge forming device of an internal combustion engine having an intake manifold provided with a heating chamber for heating the combustible mixture supplied to the engine, and comprising, in combination, a mixture proportioning means, a control unit for operating said mixture proportioning means and including a housing, thermally responsive means in said housing adapted to operate the mixture proportioning means, suction operated element adapted to move the mixture proportioning means toward position to lean the mixture upon increase of suction, and adjustable means to limit the movement of said suction operated element as the suction increases, whereby the mixture proportions when operating with a partly open throttle can be determined, said means comprising an angular member connected to the suction operated element and an adjustable stop member engaging said angular member.

3. An automatic choke mechanism for the charge forming device of an internal combustion engine having an intake manifold provided with a heating chamber for heating the combustible mixture supplied to the engine, and comprising, in combination, a mixture proportioning means, a control unit for operating said mixture proportioning means and including a housing, thermally responsive means in said housing adapted to operate the mixture proportioning means, a suction operated member adapted to move the mixture proportioning means toward position to lean the mixture, a stop carried by said suction operated member, said stop being an angular element depending from the bottom of said suction operated member and a manually adjustable element movable in the path of movement of said angular element for variably limiting the movement of said suction operated element upon increase of suction.

4. An automatic choke mechanism for the charge forming device of an internal combustion engine having an intake manifold provided with a heating chamber for heating the combustible mixture supplied to the engine, and comprising, in combination, a mixture proportioning means, a control unit for operating said mixture proportioning means and including a housing, suction operated means in said housing adapted to operate said mixture proportioning means, a suction passage leading to said suction operated means from the engine intake passage and a chamber in said suction passage adjacent the heating chamber adapted to act as a vaporizing device for any combustible mixture which may enter the suction passage upon reduction of suction in the intake passage.

5. An automatic choke mechanism for the charge forming device of an internal combustion engine having an intake manifold provided with a heating chamber for heating the combustible mixture supplied to the engine, and comprising, in combination, a mixture proportioning means, a control unit for operating said mixture proportioning means and including a housing, a throttle for regulating the amount of mixture supplied by the charge forming device to the engine, a shaft operable in accordance with engine temperature and suction conditions for determining the position of said mixture proportioning means, and a stop member supported on and operable by said shaft for variably determining the closed or idle position of said throttle.

6. An automatic choke mechanism for the charge forming device of an internal combustion engine having an intake manifold provided with a heating chamber for heating the combustible mixture supplied to the engine, and comprising, in combination, a mixture proportioning means, a control unit for operating said mixture proportioning means and including a housing, a throttle for regulating the amount of mixture supplied by the charge forming device to the engine, a shaft operable in accordance with engine temperature and suction conditions for determining the position of said mixture proportioning means, a nut screwed into said housing and forming a journal for said shaft, a hub extending from said nut, a stop member journalled on said hub and operable to variably determine the closed or idle position of said throttle.

7. An automatic choke mechanism for the charge forming device of an internal combustion engine having an intake passage for supplying combustible mixture to said engine, and comprising, in combination, a mixture proportioning device adapted to control the admission of one of the components to the combustible mixture supplied to the engine by said charge forming device, a control unit for controlling the position of said mixture proportioning means including thermally responsive means operating said mixture proportioning means and adapted to be heated during operation of the engine, means responsive to variations in pressure in said intake passage for moving said mixture proportioning means toward a position to enrich the mixture upon acceleration of the engine and means for variably regulating the degree of mixture enrichment produced by said last named means in accordance with the position of said mixture proportioning means at the time the acceleration of the engine begins.

8. An automatic choke mechanism for the charge forming device of an internal combustion engine having an intake passage for supplying combustible mixture to said engine, comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, means responsive to variations in pressure in said intake passage for moving the mixture proportioning means toward a position to lean the mixture when the engine starts to run, a second pressure responsive means for moving said mixture proportioning means toward a position to enrich the mixture upon acceleration of the engine, and means for variably regulating the degree of mixture enrichment produced by said second means in accordance with the position of said mixture proportioning means at the time the acceleration of the engine begins.

9. An automatic choke mechanism for the charge forming device of an internal combustion engine having an intake passage for supplying combustible mixture to said engine comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, means responsive to variations in pressure in said intake passage for moving the mixture proportioning means toward a position to lean the mixture when the engine starts to run, a second pressure responsive means for moving said mixture proportioning means toward a position to enrich the mixture upon acceleration of the engine, means for variably regulating the degree of mixture enrichment produced by said second means in accordance with the position of said mixture proportioning means at the time the acceleration of the engine begins, and adjustable means for variably controlling the action of said first pressure responsive means.

10. An automatic choke mechanism for the charge forming device of an internal combustion engine having an intake passage for supplying combustible mixture to said engine comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, means responsive to variations in pressure in said intake passage for moving the mixture proportioning means toward a position to lean the mixture when the engine starts to run, a second pressure responsive means for moving said mixture proportioning means toward a position to enrich the mixture upon acceleration of the engine, means for variably regulating the degree of mixture enrichment produced by said second means in accordance with the position of said mixture proportioning means at the time the acceleration of the engine begins, and manually adjustable means for variably controlling the action of said first pressure responsive means.

11. An automatic choke mechanism for the charge forming device of an internal combustion engine having an intake passage for supplying combustible mixture to said engine comprising, in combination, a mixture proportioning device adapted to control the admission of one of the components of the combustible mixture supplied to the engine by said charge forming device, a control unit for controlling the position of mixture proportioning means, including thermally responsive means for operating said mixture proportioning means and adapted to be heated during operation of the engine, means responsive to variations in pressure in said intake passage for moving the mixture proportioning means toward a better position to lean the mixture when the engine starts to run, a second pressure responsive means for moving said mixture proportioning means toward a position to enrich the mixture upon acceleration of the engine, manually operable means for variably controlling the action of the first pressure responsive means and automatic means for variably controlling the effectiveness of the second pressure responsive means.

12. An automatic choke mechanism for the charge forming device of an internal combustion engine having an intake passage for supplying combustible mixture to said engine and comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, pressure responsive means operable upon reduction in pressure in the intake passage to move said mixture proportioning means toward a position to lean the mixture, another pressure responsive means operable upon an increase in pressure in the intake passage to move said mixture proportioning means toward a position to enrich the mixture and means for automatically varying the effectiveness of said last named means in accordance with the position of said means at the time it becomes effective.

13. An automatic choke mechanism for the charge forming device of an internal combustion engine having an intake passage for supplying combustible mixture to said engine comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, pressure responsive means operable upon reduction in pressure in the intake passage to move said mixture proportioning means toward a position to lean the mixture, another pressure responsive means operable upon an increase in pressure in the intake passage to move said mixture proportioning means toward a position to enrich the mixture, means for manually regulating the effectiveness of said first mentioned pressure responsive device and means for automatically varying the effectiveness of said last named means in accordance with the position of mixture proportioning means at the time said last named means becomes effective.

14. An automatic choke mechanism for the charge forming device of an internal combustion engine having an intake passage for supplying combustible mixture to said engine comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, a pressure responsive device comprising a cylinder and a piston slidable therein and subject to variations in pressure in the intake passage for moving said mixture proportioning means toward a position to enrich the mixture and means for progressively increasing the effective pressure on said piston as the mixture proportioning means is moved toward its mixture enriching position.

15. An automatic choke mechanism for the charge forming device of an internal combustion engine having an intake passage for supplying combustible mixture to said engine comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, a pressure responsive device comprising a cylinder and a piston slidable therein and subject to variations in pressure in the intake passage for moving said mixture proportioning means toward a position to enrich the mixture; a second pressure responsive member subject to variations in pressure in the intake passage for moving said mixture proportioning means toward a position to lean the mixture, manually operable means for regulating the pressure effective on said second pressure responsive piston and means for progressively increasing the effective pressure on said piston as the mixture proportioning means is moved toward its mixture enriching position.

16. An automatic choke mechanism for the charge forming device of an internal combustion engine having an intake passage for supplying combustible mixture to said engine comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, a pressure responsive device comprising a cylinder and a piston slidable therein and subject to variations in pressure in the intake passage for moving said mixture proportioning means toward a position to enrich the mixture, and a slot in the wall of the cylinder for controlling the pressure effective on the piston.

17. An automatic choke mechanism for the charge forming device of an internal combustion engine having an intake passage for supplying combustible mixture to said engine and comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, a pressure responsive device comprising a cylinder and a piston slidable therein and subject to variations in pressure in the intake passage for moving said mixture proportioning means toward a position to enrich the mixture, and a slot in the wall of the cylinder adjacent the piston, said slot being of varying cross sectional area throughout its length for variably controlling the pressure effective on the piston.

18. An automatic choke mechanism for the charge forming device of an internal combustion engine having an intake passage for supplying combustible mixture to said engine comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, a pressure responsive device comprising a cylinder and a piston slidable therein and subject to variations in pressure in the intake passage for moving said mixture proportioning means toward a position to enrich the mixture, and a slot in the wall of the cylinder adjacent the piston of progressively increasing cross sectional area whereby the pressure effective on said piston is reduced as said piston moves toward the larger end of said slot.

19. An automatic choke mechanism for the charge forming device of an internal combustion engine having an intake passage for supplying combustible mixture to said engine comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, a pressure responsive device comprising a cylinder and a piston slidable therein and subject to variations in pressure in the intake passage for moving said mixture proportioning means toward a position to enrich the mixture, a second pressure responsive member subject to variations in pressure in the intake passage for moving said mixture proportioning means toward a position to lean the mixture, a conduit for communicating the pressure of the intake passage to said second pressure responsive member, a valve in said conduit for controlling the effective pressure on said second pressure responsive member as desired, and a pressure by-pass comprising a slot in the wall of said cylinder adjacent the piston and of varying cross sectional area for variably controlling the pressure effective on said piston as the latter moves to different positions.

20. An automatic choke mechanism for the charge forming device of an internal combustion engine having an intake passage for supplying combustible mixture to said engine comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, a pressure responsive device comprising a cylinder and a piston slidable therein and subject to variations in pressure in the intake passage for moving said mixture proportioning means toward a position to enrich the mixture, a slot in the wall of the cylinder for controlling the pressure effective on the piston, and a second pressure responsive member also subject to variations in pressure in the intake passage for moving said mixture proportioning device toward a position to lean the mixture.

21. An automatic choke mechanism for the charge forming device of an internal combustion engine having an intake passage for supplying combustible mixture to said engine comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, pressure responsive means subject to variations in the pressure in the intake passage operable to move said mixture proportioning means toward a position to enrich the mixture upon an increase in pressure, means for automatically varying the effective pressure on said last named means in accordance with the position of the mixture proportioning means, another pressure responsive means subject to variations in pressure in the intake passage and operable to move said mixture proportioning means toward a position to lean the mixture upon decrease of pressure and means to control the effectiveness of said last named means independently of the position of said mixture proportioning means.

22. An automatic choke mechanism for the charge forming device of an internal combustion engine having an intake passage for supplying combustible mixture to said engine comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, a pressure responsive device comprising a cylinder and a piston slidable therein and subject to variations in pressure in the intake passage for moving said mixture proportioning means toward a position to enrich the mixture, a passage of variable cross sectional area in the wall of the cylinder for variably controlling the pressure effective on the piston in accordance with the position of the mixture proportioning means, a second pressure responsive device operable to move said mixture proportioning device toward a position to lean the mixture upon a decrease of pressure in the intake passage and means for controlling the effectiveness of said device independently of the position of said mixture proportioning means.

23. An automatic choke mechanism for the charge forming device of an internal combustion engine having an intake passage for supplying combustible mixture to said engine comprising, in combination, a mixture proportioning device adapted to control the admission of one of the components of the combustible mixture supplied to the engine by said charge forming device, a control unit for controlling the position of said mixture proportioning means including thermally responsive means for operating said mixture proportioning means and adapted to be heated during operation of the engine, a pressure responsive device subject to variations in pressure in the intake passage and operable to move said mixture proportioning means toward a position to enrich the mixture upon an increase in pressure, said device comprising a cylinder and a piston slidable therein and operatively connected to the mixture proportioning means, a slot in the wall of the cylinder adjacent the piston and extending in a direction parallel to the path of movement of the piston, said slot being of varying cross sectional area throughout its length and operative to vary the pressure effective on said piston as the piston moves to different positions in the cylinder, a second pressure responsive device subject to variations in the pressure in the intake passage and operable to move the mixture proportioning device toward a position to lean the mixture upon a decrease in pressure, and a valve operable to control the effectiveness of said second pressure responsive device as desired.

24. An automatic choke mechanism for the charge forming device of an internal combustion engine having an intake passage for supplying combustible mixture to said engine, comprising, in combination, an air choke regulating admission of air, a control unit for operating said choke valve including a thermally responsive device adapted to be heated during operation of the engine, means responsive to variations in pressure in said intake passage for moving said choke valve toward closed position upon acceleration of the engine and means for variably regulating the movement of said valve in accordance with the position of the valve at the beginning of such movement.

25. An automatic choke mechanism for the charge forming device of an internal combustion engine having an intake passage for supplying combustible mixture to said engine, comprising, in combination, an air choke regulating admission of air, a control unit for operating said choke valve including a thermally responsive device adapted to be heated during operation of the engine, means responsive to variations in pressure in said intake passage for moving said choke valve toward closed position upon acceleration of the engine, means for variably regulating the movement of said valve toward closed position in accordance with the position of the valve at the beginning of such movement, and a second pressure responsive device operable to move the choke valve toward open position upon decrease in pressure in the intake passage.

26. An automatic choke mechanism for the charge forming device of an internal combustion engine having an intake passage for supplying combustible mixture to said engine, comprising, in combination, an air choke regulating admission of air, a control unit for operating said choke valve including a thermally responsive device adapted to be heated during operation of the engine, means operable to move said choke valve toward closed position upon an increase in pressure to enrich the mixture, said means comprising a member operatively connected to the valve and subject to variations in pressure in the intake passage, means for variably controlling the pressure effective on said member in accordance with the position of said choke valve, a second pressure responsive means operable upon decrease of pressure in the intake passage to move said choke valve toward open position and means for controlling the effectiveness of said last named means independently of the position of said choke valve.

27. An automatic choke mechanism for the charge forming device of an internal combustion engine provided with a heating chamber adapted to be heated by exhaust gas comprising, in combination, a mixture proportioning means, a control unit for controlling the position of said mixture proportioning means, and including a housing, a thermally responsive element in said housing and adapted to operate the mixture proportioning means, means for securing said housing to the wall of the heating chamber and a metallic heat conducting element secured between the housing and heating chamber and extending toward and around said thermally responsive element on three sides of the latter to conduct heat from the heating chamber to said thermally responsive element.

28. An automatic choke mechanism for the charge forming device of an internal combustion engine provided with a heating chamber adapted to be heated by exhaust gas, comprising, in combination, a mixture proportioning means, a control unit for controlling the position of said mixture proportioning means and including a housing, a thermally responsive element in said housing and adapted to operate the mixture proportioning means, means for securing said housing to the wall of the heating chamber, a pressure responsive member also effective to operate said mixture proportioning means, a heat conducting element secured between said heating chamber and the housing and extending toward the thermally responsive element to conduct heat thereto, said heat conducting element being so constructed as to form a chamber between itself and the wall of the heating chamber, conduits connecting said chamber with the intake passage and the pressure responsive member respectively, whereby said chamber forms a part of the passage which communicates the pressure of the intake passage to said pressure responsive element.

29. An automatic choke mechanism for the charge forming device of an internal combustion engine provided with a heating chamber adapted to be heated by exhaust gas comprising, in combination, a mixture proportioning means, a control unit for controlling the position of said mixture proportioning means, and including a thermally responsive element adapted to operate the mixture proportioning means, a pressure responsive means also effective to operate said mixture proportioning means, and a passage for communicating the pressure of the intake passage to said pressure responsive means, said passage having a closed, enlarged chamber formed therein to form a reservoir for any fuel which may collect in said passage.

30. An automatic choke mechanism for the charge forming device of an internal combustion engine provided with a heating chamber adapted to be heated by exhaust gas, comprising, in combination, a mixture proportioning means, a control unit for controlling the position of said mixture proportioning means, and including a thermally responsive element adapted to operate the mixture proportioning means, a pressure responsive means also effective to operate said mixture proportioning means, a passage for communicating the pressure of the intake passage to said pressure responsive means, said passage having a closed, enlarged chamber formed therein to form a reservoir for any fuel which may collect in said passage, and means for heating said chamber to vaporize any fuel collected therein.

31. An automatic choke mechanism for the charge forming device of an internal combustion engine provided with a heating chamber comprising, in combination, a mixture proportioning means, a control unit for determining the position of said mixture proportioning means including a thermally responsive means, a shaft operated by said thermally responsive means and operatively connected to said mixture proportioning means, a throttle for regulating the movement of mixture supplied to the engine, a stop member carried by said shaft and operable thereby to variably determine the closed or idle position of the throttle, and means permitting movement of said shaft relative to the stop member.

32. An automatic choke mechanism for the charge forming device of an internal combustion engine provided with a heating chamber, comprising, in combination, a mixture proportioning means, a control unit for determining the position of said mixture proportioning means including a thermally responsive means, a shaft operated by said thermally responsive means and operatively connected to said mixture proportioning means, a throttle for regulating the movement of mixture supplied to the engine, a stop member rotatably supported on said shaft, means for positively connecting said stop member with the shaft for rotation therewith when the shaft is rotated in one direction and means for yieldingly connecting the stop member with said shaft when the latter is rotated in the opposite direction.

33. An automatic choke mechanism for the charge forming device of an internal combustion engine and comprising, in combination, a mixture proportioning means, a control unit for positioning said mixture proportioning means and comprising a housing, thermally responsive means for operating the mixture proportioning means, means for heating said thermally responsive means when the engine is operating, means responsive to variations in pressure adapted to move the mixture proportioning means toward position to enrich the mixture during the acceleration period and means for variably regulating the degree of mixture enrichment produced by said last named means in accordance with different operating conditions which may occur at the time such mixture enriching means becomes operative.

CLARENCE H. JORGENSEN.